(12) United States Patent
Lechevalier

(10) Patent No.: US 10,259,605 B2
(45) Date of Patent: Apr. 16, 2019

(54) TYING DEVICE

(71) Applicant: Ateliers de Recherches et Conceptions A.R.C., Offranville (FR)

(72) Inventor: Eric Lechevalier, Varengeville sur Mer (FR)

(73) Assignee: Ateliers De Recherches Et Conceptions A.R.C., Offranville (FR)

( * ) Notice: Subject to any disclaimer, the term of this patent is extended or adjusted under 35 U.S.C. 154(b) by 89 days.

(21) Appl. No.: 15/110,965

(22) PCT Filed: Jan. 13, 2015

(86) PCT No.: PCT/FR2015/050069
§ 371 (c)(1),
(2) Date: Jul. 12, 2016

(87) PCT Pub. No.: WO2015/104516
PCT Pub. Date: Jul. 16, 2015

(65) Prior Publication Data
US 2016/0332757 A1      Nov. 17, 2016

(30) Foreign Application Priority Data
Jan. 13, 2014 (FR) ...................................... 14 50253

(51) Int. Cl.
*B65B 13/26* (2006.01)
*B65B 13/10* (2006.01)
(Continued)

(52) U.S. Cl.
CPC ................ *B65B 13/26* (2013.01); *A01G 5/02* (2013.01); *B65B 13/10* (2013.01); *B65B 13/182* (2013.01);
(Continued)

(58) Field of Classification Search
CPC ..... B65B 11/00; B65B 11/004; B65B 11/006; B65B 11/10; B65B 13/02; B65B 13/04; B65B 13/06; B65B 13/10; B65B 13/182; B65B 13/22; B65B 13/24; B65B 13/26; B65B 13/28; B65B 27/10; B65B 61/20; B65B 61/202; B65B 61/205; B65C 7/00; B65C 9/01; B65C 9/18; A01G 5/02
See application file for complete search history.

(56) References Cited

U.S. PATENT DOCUMENTS 2,374,900 A * 5/1945 Saxton .................... B65B 13/26
100/17
3,104,606 A * 9/1963 Kerrigan ................. B65B 13/08
100/17
(Continued)

FOREIGN PATENT DOCUMENTS

FR    2 790 732      9/2000
JP    H0681904     11/1994
(Continued)

OTHER PUBLICATIONS

International Search Report for PCT/FR2015/050069 dated Mar. 25, 2015, 2 pages.

*Primary Examiner* — Ismael Izaguirre
(74) *Attorney, Agent, or Firm* — Dority & Manning, P.A.

(57) ABSTRACT

The invention relates to a tying device of a type comprising: a work surface (10) comprising an opening (11) in the shape of a slot; a tying member (103) which can be activated so as to place at least one string (400) around an item (500) which is moving in a transfer direction (A) on a first side of the work surface (10), and to carry a portion of said string (400) to a second side of the work surface (10), forming at least one loop; and a knotting lip (55) capable of closing the loop with a knot on the second side of the work surface (10). The slot extends generally in the transfer direction (A), allowing a portion of the loop to pass through, but keeping the knot on the second side of the work surface (10) over at least a portion of the movement of the item (500).

14 Claims, 11 Drawing Sheets

(51) Int. Cl.
    *A01G 5/02* (2006.01)
    *B65B 13/18* (2006.01)
    *B65B 61/20* (2006.01)
    *B65B 27/10* (2006.01)
    B65B 27/00 (2006.01)
    B65C 7/00 (2006.01)

(52) U.S. Cl.
    CPC ............ *B65B 27/10* (2013.01); *B65B 61/202*
        (2013.01); *B65B 61/205* (2013.01); *B65C 7/00*
        (2013.01)

(56) References Cited

U.S. PATENT DOCUMENTS

| | | | | |
|---|---|---|---|---|
| 4,262,944 A | * | 4/1981 | Branch | B65B 27/10 289/11 |
| 4,495,747 A | * | 1/1985 | Shimofuri | B65D 77/34 493/465 |
| 5,249,517 A | * | 10/1993 | Massman | B65B 27/08 100/17 |

FOREIGN PATENT DOCUMENTS

| | | | |
|---|---|---|---|
| JP | H09 267806 | | 10/1997 |
| NL | 1004347 C2 | * | 4/1998 |
| NL | 2 007 872 | | 5/2013 |

\* cited by examiner

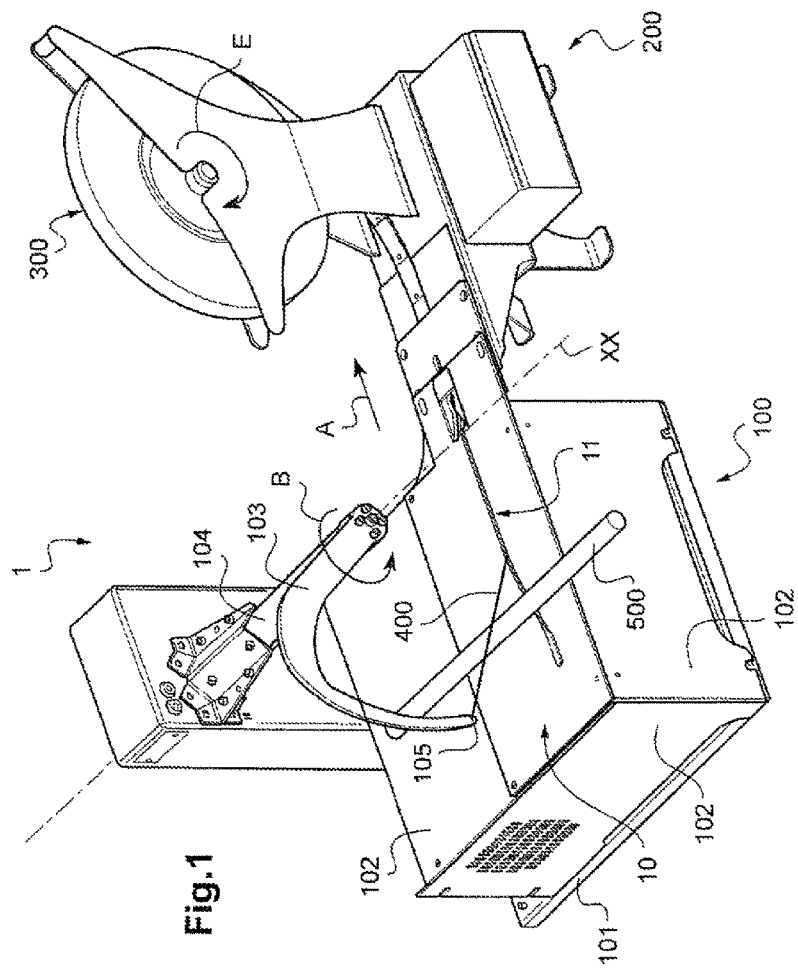

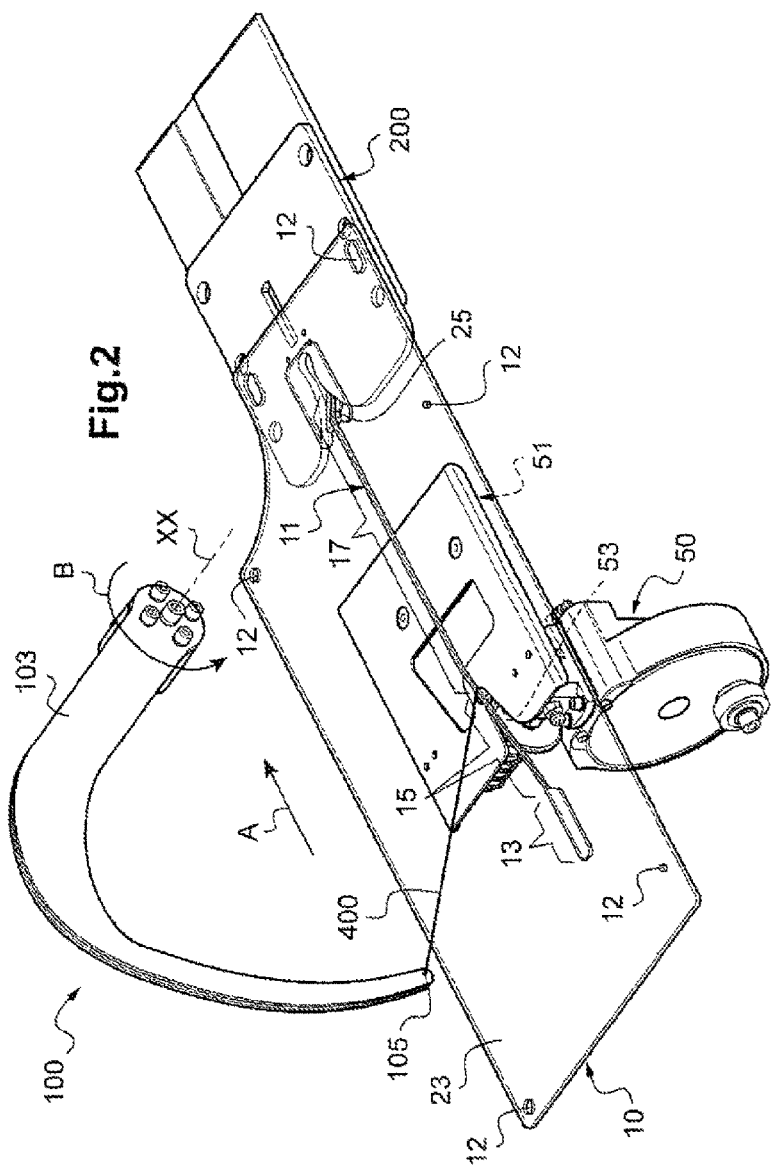

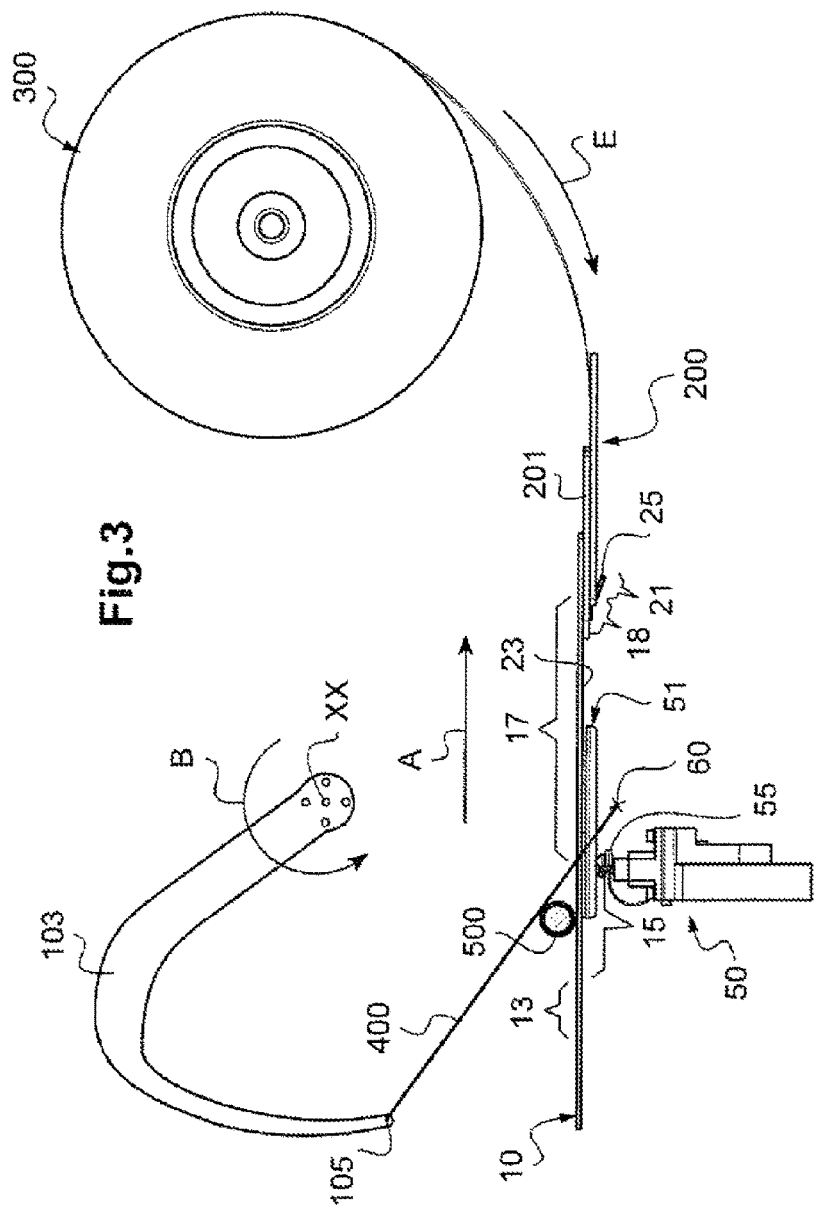

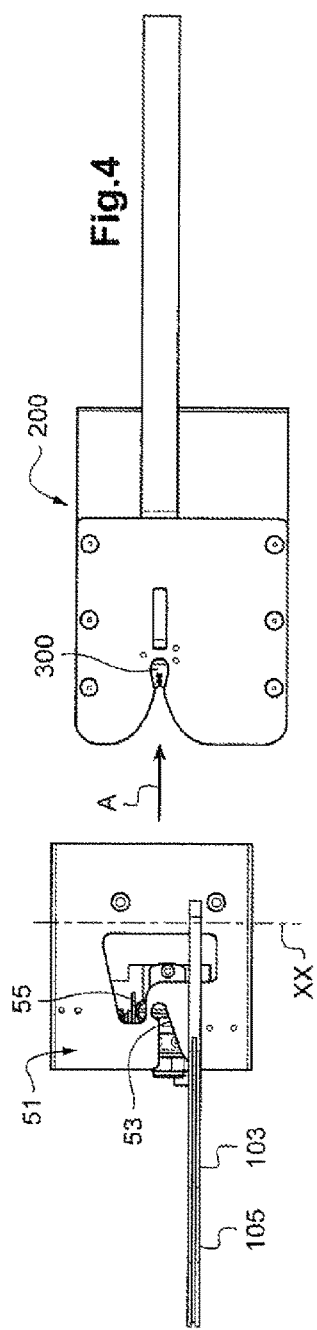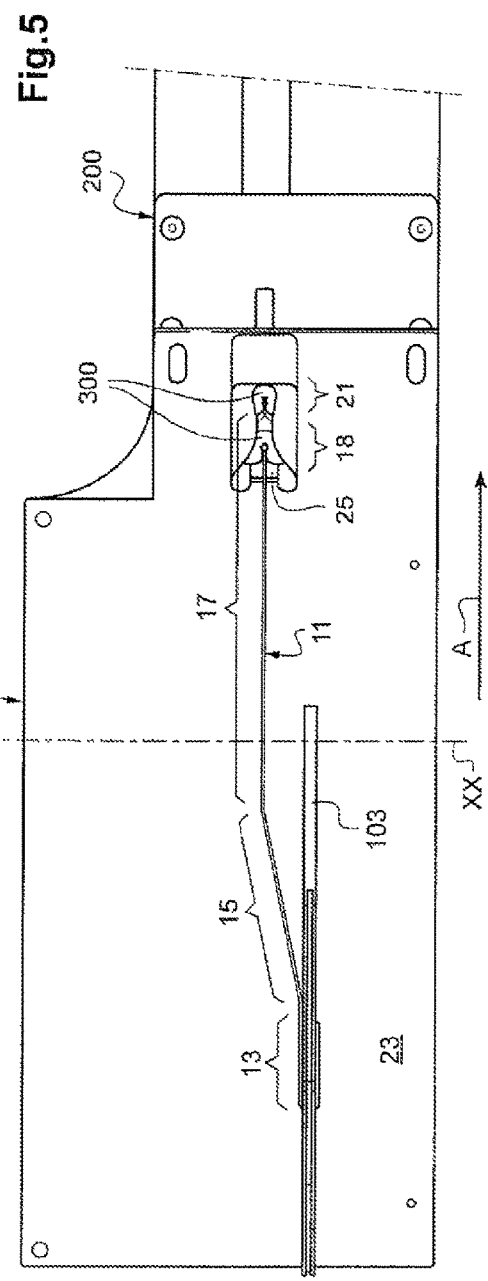

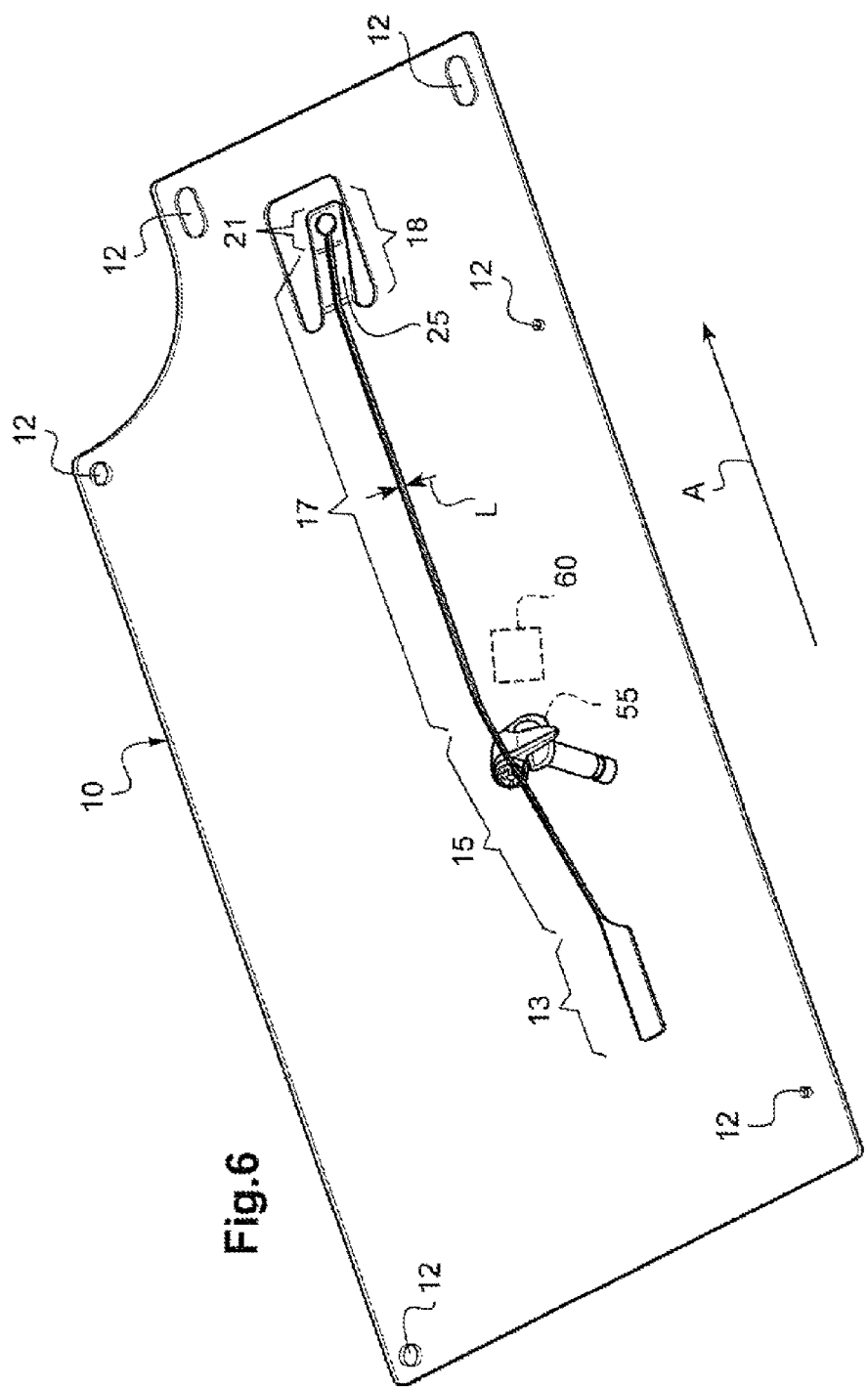

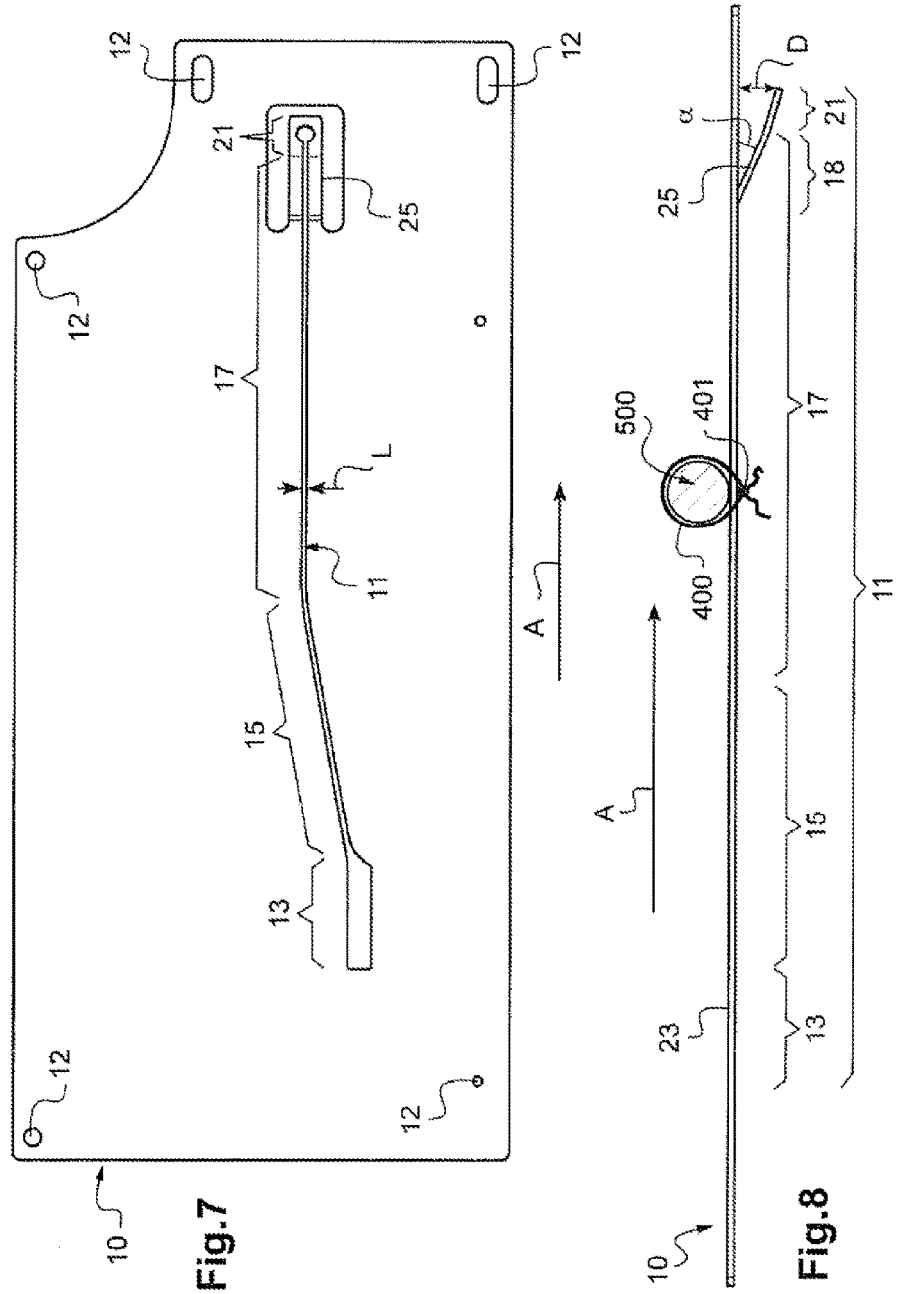

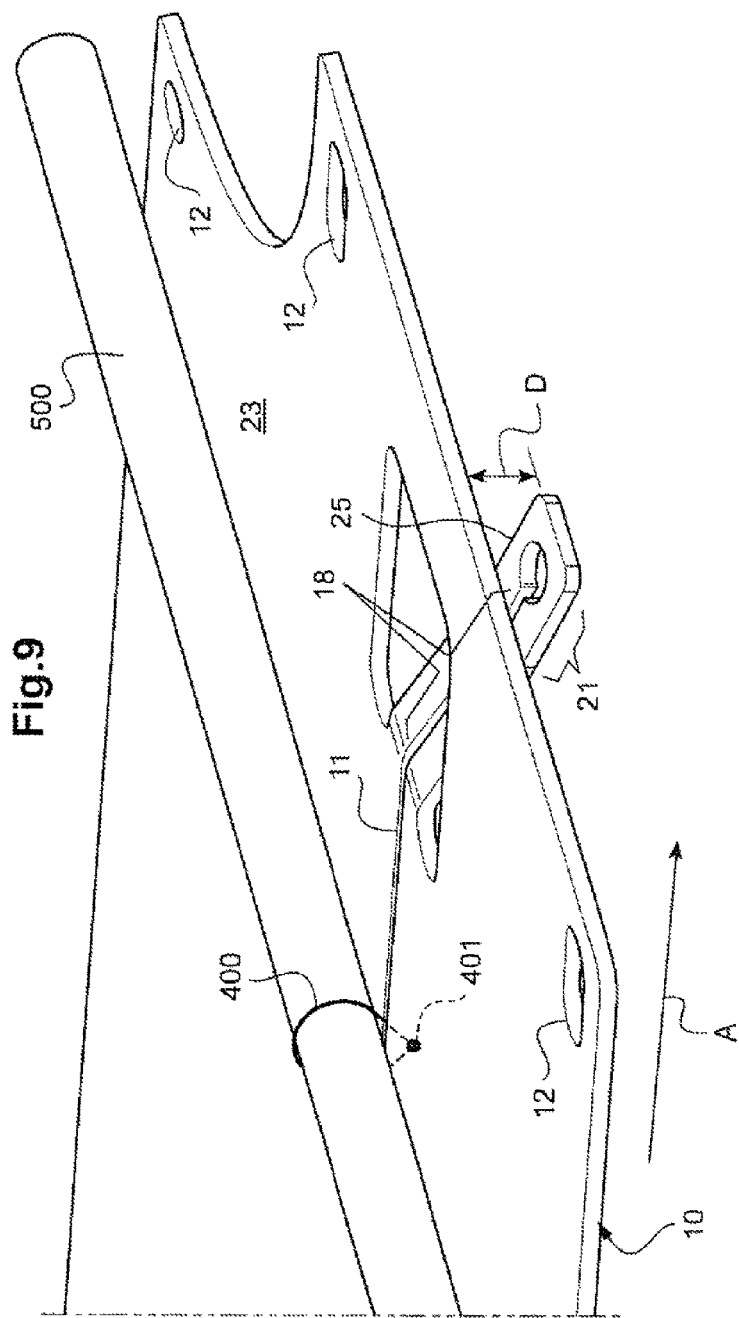

TYING DEVICE

CROSS REFERENCE TO RELATED APPLICATION

This application is the national stage entry of International Patent Application No. PCT/FR2015/050069 having a filing date of Jan. 13, 2015, which claims priority to and the benefit of French Patent Application No. 1450253 filed in the French Intellectual Property Office on Jan. 13, 2014, the entire contents of which are incorporated herein by reference.

The invention falls within the field of article packaging, in particular by means of tying.

Tying consists, in a general manner, of placing a tie around an article so as to form one or several loops, and to close the loops by means of one or several knots keeping the tie tightened against the article.

Tying is used, for example, for the packaging of stacks of cardboard boxes, of electric wire bundles or of stacks of magazines.

In particular, tying is used to attach together products where the stems are grouped into bundles, for example asparagus, or into bouquets, for example cut flowers. In this case, bundling is sometimes referred to rather than tying. Bundling can thus be seen as the tying of an article which is configured as a bundle or as a bouquet.

The invention is intended to apply to tying in general, such as to the specific case of bundling.

For reasons of speed, packaging professionals generally use specific devices to tie the articles. A tying device generally comprises a work table, which is provided with an opening, a tying member, which places the tie around an article which is moving in a direction of transfer above the table and brings part of said tie under the work table thus forming one or several loops, and a knotting lip, which is capable of closing the loop by forming a knot with the tie, under the work table.

The technique generally distinguishes between semi-automatic type devices, in which the article is moved manually, whilst the tying member and/or the knotting lip are actuated automatically, and automatic devices in which the movement of the article is also assured automatically, conventionally by means of a conveyor.

In semi-automatic tying devices, the tying can be triggered manually, in reaction to the detection, by means of a photo-electric cell for example, of the presence of an article or following the tightening of the tie when it meets the article for example. The triggering can also be controlled by a switch or by a pedal activated by an operator, or even by a contactor activated by contact with the article.

The automatic devices are most often incorporated within a packaging line, the different stations of which cooperate with a same article conveying system. The tying is therefore triggered each time an article crosses the tying station.

FR 2 903 668, for example, discloses an automatic tying machine.

It has become usual for a long time now to label articles in parallel with their tying.

Depending on the articles, it is sometimes not possible to use adhesive type labels, in particular in the case of dirty articles. such as leeks or onions covered in soil, or fragile articles such as cut flowers.

As a substitute, an attempt is generally made to attach the label to the tie rather than to the article. This is done most often manually, once the article has been bundled/tied.

Said manual operation is practically incompatible with research into increasingly faster packaging speeds and increasingly stricter safety conditions.

NL 2007 872 discloses a pneumatic arm juxtaposed with an automatic bundling line. The pneumatic arm is deployed in order to place a self-adhesive label onto the tie before the tie surrounds the article and therefore before knotting, and is then withdrawn.

By attaching the label to the tie rather than directly onto the articles, damage to said latter is limited.

However, the bundling machine and the pneumatic arm work in an alternating manner, which results in an increase in the length of a cycle. To reduce the dead time between the working phase of the bundling machine and that of the pneumatic arm, the timing must be precisely controlled, which can prove complicated.

Furthermore, the final positioning of the label with regard to the article depends on the size of the article at the point where the tie is wrapped around. When said size is likely to vary from one article to the other, there is a risk that, for certain of said articles, the information borne by the label is ultimately concealed or badly oriented.

In addition, the configuration and the drive of the pneumatic arm are specific to the particular configuration of the bundling machine. A given pneumatic arm cannot easily be adapted to other automated machines and other applications.

Finally, a pneumatic arm requires a pressurized air supply, which can be costly, fragile, cumbersome and noisy to use.

The invention aims to improve the situation. The object thereof is a tying device of the type comprising a work surface comprising an opening, a tying member, which is activatable so as to place at least one tie around an article which is moving in a direction of transfer from a first side of the work surface and so as to bring part of said tie from a second side of the work surface thus forming at least one loop, and a knotting lip which is capable of closing the loop by means of a knot on the second side of the work surface. The opening is configured at least partially as a slot which extends generally in the direction of transfer and which is arranged in order to allow part of the loop to pass through but to hold the knot on the second side of the work surface over at least part of the movement of the article in the direction of transfer.

The proposed device allows the part of the article engaged in the tie to be effortlessly moved away from the knot which closes said tie.

Among other things, this allows a label to be attached to the loop, for example by fixing it to a part of the tie that has been moved away from the article or by inserting it between the article and the knot, into the loop.

The proposed device is compatible with a fully automated operation and a semi-automated operation. It avoids damaging the articles. The positioning of the label with regard to the article is precise and is able to be reproduced. In particular, it is independent of the variations in dimension between articles. It is capable of operating at speeds that are comparable to those of conventional tying machines.

The proposed device can be realized by adapting, with few modifications, existing tying machines.

The proposed device is intended to be used more widely than for the labeling of articles.

For example, it allows an article to be combined with a different kind of product, for example an accessory. In particular, it allows a small object to be inserted into a bunch of large objects.

For example, the proposed device can be used to combine a sachet of plant protection product with a bouquet of cut flowers which is held by a tie. The proposed device remains effective in spite of the difference in shape and size between the flowers and the sachet. In particular, it avoids having to hold the sachet against the flowers before bundling. The tightening of the tie makes it difficult to insert the sachet between the tie and the flowers after bundling.

In another example, the proposed device allows a straw or an extension to be fixed on the spray head to be combined with a spray. The proposed device remains effective in spite of the very small size of the straw in relation to the spray.

The proposed device allows the knot to be kept at a distance from the article, and the portions of the tie to be held at a spacing from the article. It is therefore easy to fix a label there without impeding the rest of the packaging process.

Thanks to the disengagement of portions of the tie, a free space is temporarily arranged between the article and the knot. It is therefore easily possible to insert an object therein. The inserted object can take the form of a sachet, a label, a straw or similar. More generally, any object which fits said free space is able to be inserted therein before the knot is released from the slot. Said releasing causes the tie to be retightened around the unit formed by the article and the inserted object.

Said operation subsequent to the tying is particularly advantageous when the conveying system does not allow the article and the accessory to be brought to the tying station in a configuration which is suitable for the tying. This occurs in particular when the article and the accessory are objects of a different nature, dimension and/or weight. For example, the hooks or buckets, supporting the cut flowers on existing conveying systems are not generally capable of holding a small sachet at the same time as a bouquet of cut flowers before bundling.

According to a second aspect, the object of the invention is an accessory for a tying device of the type comprising a tying member, which is activatable so as to place at least one tie around an article which is moving in a direction of transfer, and a knotting lip. The accessory is adapted in order be assembled on the device in a manner so as to form a work surface thereon which comprises an opening which is configured at least partially as a slot, in such a manner that the tying member places the tie around the article from a first side of the work surface and brings part of said tie from the second side of the work surface thus forming at least one loop, whilst the knotting lip closes the loop by means of a knot on the second side of the work surface. The slot extends in general in the direction of transfer. The slot is arranged in order to allow part of the loop to pass through but to hold the knot on the second side of the work surface over at least part of the movement of the article in the direction of transfer.

According to a third aspect, the object of the invention is an automatic labeling method. In said procedure, an article is moved, in a direction of transfer, from a first side of a work surface which comprises an opening which is configured at least in part as a slot. At least one tie is placed around the article from the first side of the work surface and part of said tie is brought from the second side of the work surface thus forming at least one loop. The loop is closed by means of a knot from the second side of the work surface. Part of the loop is allowed to pass through the slot, but the knot is held on the second side of the work surface thanks to said slot during at least part of the movement of the article in the direction of transfer. The article is moved away from the slot so as to place a label between the article and the knot.

Other characteristics, details and advantages of the invention will appear on reading the detailed description below, and from the accompanying drawings, in which:

FIG. 1 shows a perspective view of a tying device;

FIG. 2 shows a detailed view, in perspective, of part of the device in FIG. 1;

FIG. 3 shows a side view of another part of the device in FIG. 1;

FIG. 4 shows a top view of yet another part of the device in FIG. 1;

FIG. 5 shows a top view of a work table for a tying device;

FIG. 6 shows a perspective view of the table in FIG. 5;

FIG. 7 shows a top view of the work table in FIG. 5, in the isolated state;

FIG. 8 shows a side view of the table in FIG. 7;

FIG. 9 shows a perspective view of part of the work table in FIGS. 5 to 8;

Figure 10:
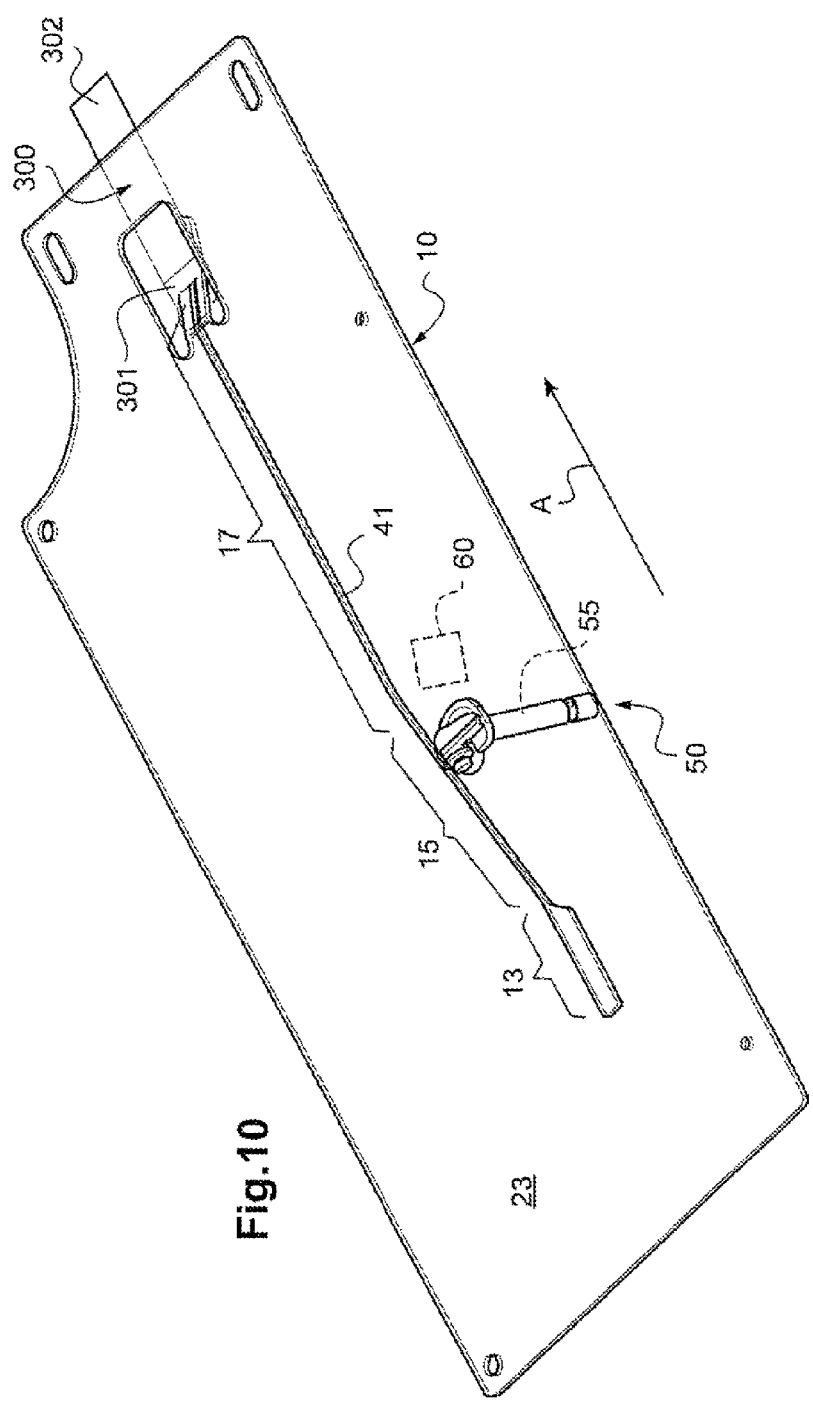
Figure 11:
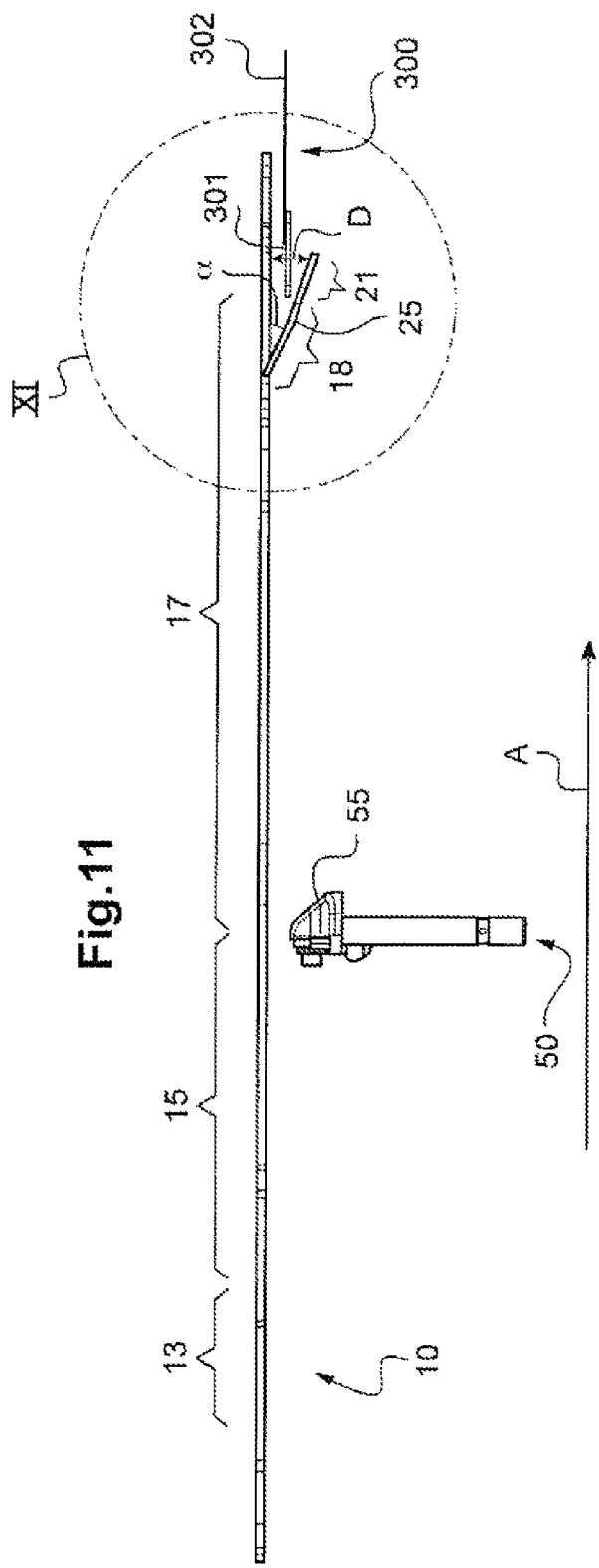
Figure 12:
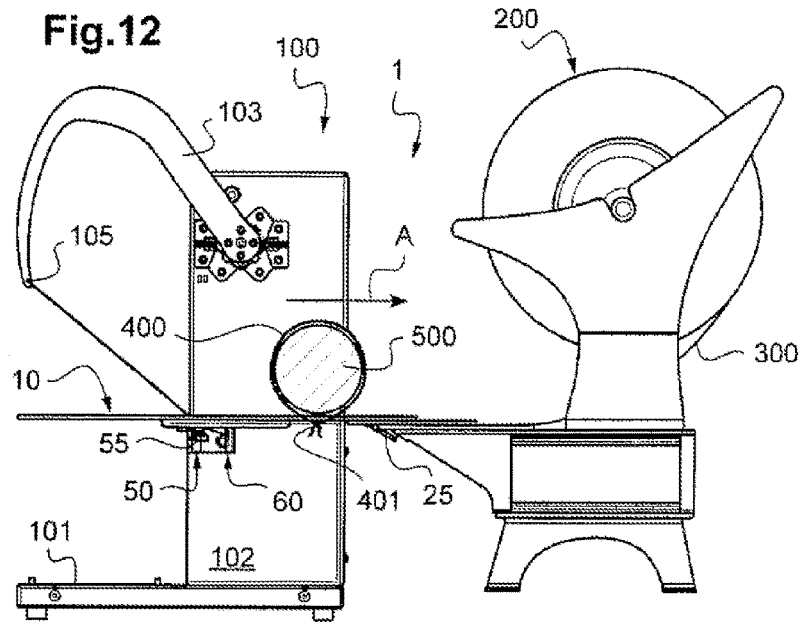
Figure 13:
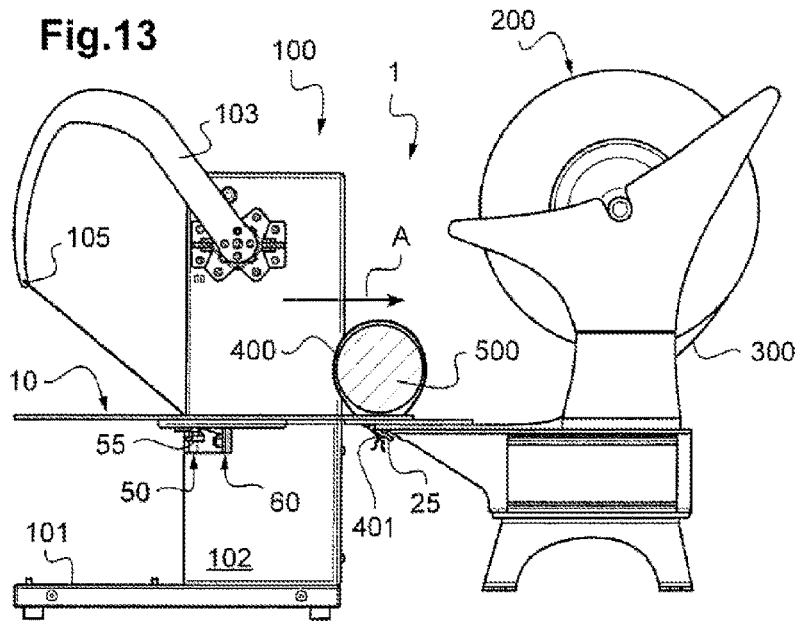
Figure 14:
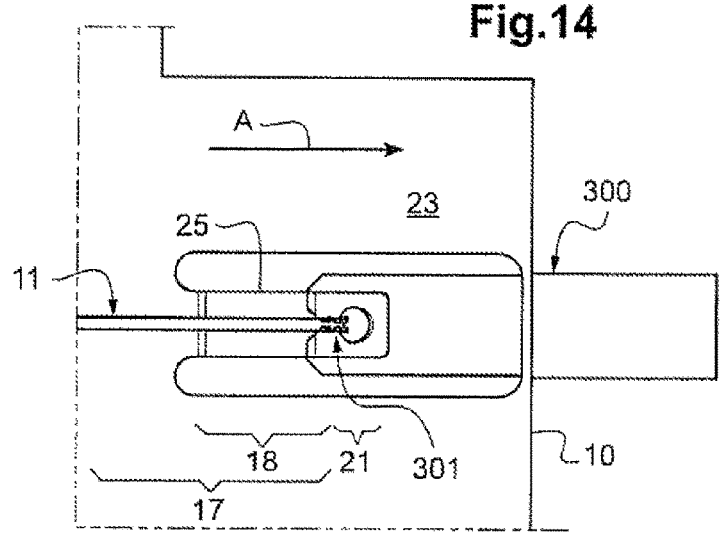

FIG. 10 corresponds to FIG. 6 and shows the work table in a situation with a label;

FIG. 11 shows a side view corresponding to FIG. 10;

FIGS. 12 and 13 show a side view of a tying device in operation;

FIG. 14 shows a top view of the detail XI in FIG. 11; and

Figure 15:
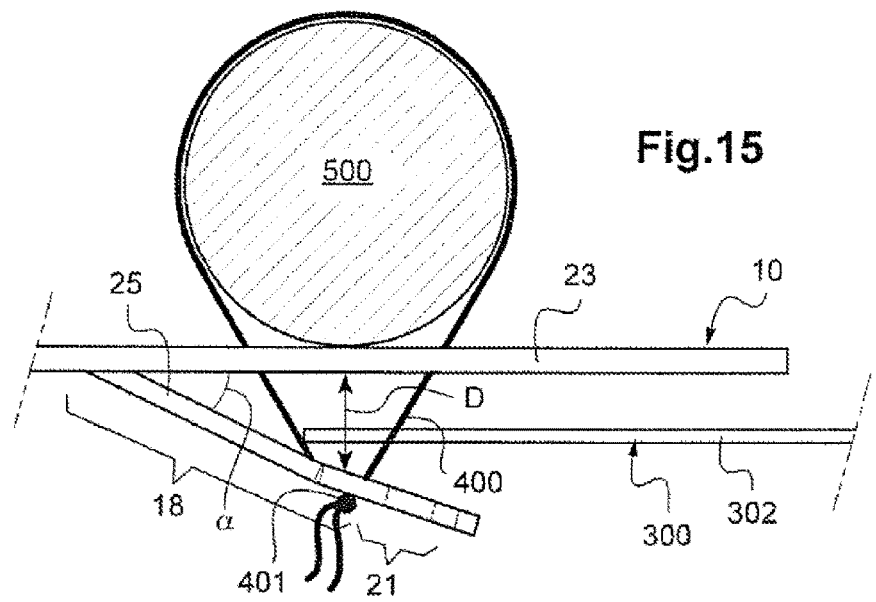

FIG. 15 shows a side view of the detail XI in FIG. 11, in which a tied article is shown.

The accompanying drawings comprise elements of a certain character. They will therefore be able not only to serve to complete the invention but also to contribute to its definition, where appropriate.

FIG. 1 shows a tying device 1 which is intended to realize one or several ties tightened around products which are not shown individually. The term article is to be understood as the unit held by a tie at the end of the tying/bundling process. The article can be constituted by one single product or by a set of similar products grouped together. For example, a spray on its own can constitute an article. Several cut flowers which should be assembled as a bouquet constitute another article.

The tying device 1 comprises a tying unit 100 and a labeling unit, in this case in the form of a labeling machine 200, juxtaposed one next to the other.

The tying unit 100 comprises a frame 101 which is closed at least in part by a casing 102 so as to form a housing, in this case in a generally parallelepiped form.

The tying unit 100 further comprises a work table 10, supported here by the housing. The work table 10 closes at least part of the top of the housing.

The tying station 100 further comprises a tying member which can be actuated in order to place at least one tie 400 around an article 500 which is situated above the work table 10. In this case, the tying member comprises a jointed arm 103 which is mounted at the end of a bracket 104 so as to pivot around the longitudinal axis XX of the same.

The bracket 104 is fixedly retained in a horizontal manner above the work table 10, in this case by means of a post which rises up substantially vertically from the frame 101.

The arm 103 comprises a first end which is connected to the bracket 104 and a second end 105 which is opposite the first. The second end 105 forms a free end which serves for bringing the tie 400 which, in the example, is an elastic or non-elastic string-type flexible thread. Said tie 400, for example, is unrolled from a supply reel (not visible) which is mounted so as to be freely rotatable or is braked and is housed on the structure 101.

In the state shown in FIGS. 1 and 2, which corresponds to an initial state of the tying unit 100, the tie 400 surrounds the rocker arm 103, leaves the rocker arm 103 in the vicinity of its free end 105, then crosses an opening 11 which is arranged through the work table 10 in order to be recovered by a retaining mechanism 60 which is arranged under the work table 10. In this case, the retaining mechanism 60 is accommodated in the housing.

From the initial state, the arm 103 can be actuated so as to pivot around the longitudinal axis XX such that its free end 105 leaves its initial position, or top position, for a bottom position, close to the retaining mechanism 60, situated under the work table 10. In this case, between the top position and the bottom position, the free end 105 crosses the work table 10, through the opening 11. In doing so, the free end 105 brings part of the tie 400 under the work table 10 thereby forming a loop around the article 500. Said pivoting movement is shown by the arrow B in FIG. 1.

The part of the tie 400 brought by the arm 103 under the work table 10 engages the retaining mechanism 60. A loop of the tie 400 is formed around the article 500. In the example described here, one single loop of the tie 400 is formed around the article 500. As a variant, several successive loops can be realized before knotting.

The tying unit 100 further comprises a knotting mechanism 50 which includes a knotting lip 55. The knotting mechanism 50 is arranged in the vicinity of the retaining mechanism 60, in this case under the work table 10. The knotting mechanism 50 includes a knotting lip 55 which can be actuated in order to engage the parts of the tie 400 which are engaged in the retaining mechanism 60, to form a knot 401 with said parts, and then to disengage from the knot 401.

In so doing, the knotting lip closes the loop by means of the knot 401, under the work table 10.

The rocker arm 103, the retaining mechanism 60, the knotting mechanism 50 and their mutual cooperation in a tying machine are known per se, for example through FR 2 790 732, in particular on pages 5 and 9 and in FIGS. 1, 2, 5, 6, 7 and 8 (mobile arm) and through FR 2 736 618, in particular from line 28 on page 7 to line 11 on page 8 (knotting mechanism) and from line 16 on page 8 to line 13 on page 11 (retaining mechanism). The reader is invited to refer to said documents insofar as is necessary.

In this case, the knotting mechanism 50 and the retaining mechanism 60 are accommodated, in the main at least, in the housing.

The device 1 has a free area above the work table 10 which allows the article 500 to be brought into position in relation to the arm 103, for winding and knotting the tie 400, then to be moved to the labeling machine 200. The movement of the article 500 in relation to the work table 10 can be seen as transferring the article 500, into a part of the free area, or area of transfer. Said area of transfer extends substantially in the direction of transfer of the article, or forward, shown in this case by the arrow A (oriented from left to right in FIG. 1).

In the example described here, the article is transferred in a generally straight manner, in a direction A going from left to right in FIG. 1. The article may also be moved in relation to the table 10 following a more complex path, comprising for example a bend. In other words, the term direction does not have to be limited in this case to its mathematical sense.

The transfer of the article 500 comprises a movement of said latter in relation to the table 10, movement which can be made at least in part in contact with the work table 10, but not necessarily.

Reference is now made to FIG. 2 in which a transparent view of the work table 10 is shown.

The work table 10 comprises a generally flat body 23 which is realized in this case from a sheet-metal plate. The body 23 is generally rectangular in shape.

The opening 11 in the work table 10 is generally elongated in shape in the direction of transfer A. In this case, the direction of transfer A corresponds to the longitudinal direction of the body 23.

According to the invention, the opening 11 is at least partially configured as a slot 17 which is arranged in order to allow part of the loop of the tie 400 to pass through but to hold the knot 401 under the work table 10 over at least part of the movement of the article 500.

As can be seen better in FIG. 3, the slot 17 extends along at least part of the area of transfer, in this case in the direction of transfer A. The slot 17 extends substantially from the right of the knotting lip 55 to a position remote from the knotting lip 55 in a direction of transfer A. Positioned in this manner, the slot 17 is suitable for catching the knot 401 as soon as it is released from the knotting lip 55. The contour of the slot 17 on the bottom side of the work table 10 therefore forms support and guidance for the knot 401.

The slot 17 has a width L. The width L, in this case, is substantially constant along the slot 17. The width L is greater than the diameter of the tie 400 and smaller than the diameter of the knot 401.

In one variant, the width L of the slot 17 can be adjusted by an operator. The slot 17 can be adapted in terms of the cross section of the tie 400 that is used. The slot 17 can be adjusted, for example by manipulating an adjusting screw which controls a movable part in the work table 10 opening or closing the slot 17, or by exchanging the work table 10 for another work table. A set of several work tables each having different widths L of slot 17 can be provided.

During the knotting process, the part of the tie 400 which corresponds to the loop is tensioned. When the knot 401 is released from the knotting lip 55, the knot 401 is urged toward the article 500, that is to say toward the work table 10. Said urging can result in retraction of the tie 400 and/or expansion of the article 500.

Resilient retraction of the tie 400 is obtained, for example, thanks to the use of a resilient tie 400. Expansion of the article 500 is produced each time an article has a natural tendency to expand, for example a bunch of roses.

The knot 401 abuts against a bottom face of the body 23 of the work table 10. The knot 401 is therefore supported under the work table, on the perimeter of the guide 17. The knot 401 remains held under the work table 10, substantially to the right of the knotting lip 55. The article 500 remains arranged above the work table 10, for example placed on top of it or held above it. The loop of the tie 400 extends through the opening 11 at the end of the slot 17 close to the knotting lip 55, between the article 500 and the knot 401.

When the article 500 is moved in relation to the work table 10, the slot 17 guides the loop of the tie 400 whilst keeping the knot 401 under the work table 10.

When the article 500 is moved along the area of transfer and of the slot 17 in the direction of transfer A, the knot 401 slides against the perimeter of the slot 17 under the work table 10. The article 500 and the knot 401 are movable translationally in the direction of transfer A and are held separated one from the other vertically by part of the work table 10. Said arrangement is shown schematically in FIG. 12, in an intermediate position during the movement along the slot 17.

In the example described here, the opening 11 comprises, apart from the slot 17, different successive portions arranged in the following manner substantially in the direction of transfer A:

a passage portion 13 for the rocker arm 103,
a passage portion 15 of the thread 400 upstream of the slot 17, and
an expanded portion for the release of the knot 401 downstream of the slot 17, in the form of a clearance 21.

Each of the portions of the opening 11 is open onto its neighbors. In other words, it is possible to pass from the one to the other of the portions of the opening 11 in a direction substantially parallel to the direction of transfer A.

The passage portion 13 for the arm 103 has a form and dimensions which are selected in order to allow the arm 103 to pass through the work table 10. During its rotation around the axis XX in the direction shown by the arrow B, the free end 105 of the pivoting arm 103 plunges under the work table 10 passing through the passage portion 13. In variants, the work table 10 and the arm 103 are mutually arranged so that the movement of the arm bypasses the work table 10. In this case, the opening 11 does not have to have the passage portion 13.

The passage portion 15 of the thread 400 is formed upstream of the knotting lip 55, downstream of the passage portion 13 for the rocker arm 103 and as a continuation of the passage portion 13. The passage portion 15 has a form and dimensions which are adapted for the passage of the tie 400 as the arm 103 descends. A strand of the tie 400 is therefore stretched between the article 500 above the work table 10 and the free end 105 of the arm 103 under the work table 10.

The slot 17 extends downstream of the passage portion 15 for the tie 400 and as a continuation of the same. The slot 17 rejoins the passage portion 15 substantially to the right of the knotting lip 55. Upstream of the knotting lip 55, the tie 400, not yet knotted, is guided precisely through the passage portion 15 up to the knotting lip 55 in order to engage with the same.

The orientation of the passage portion 15 is configured in order to guide the tie 400 as the pivoting arm 103 descends toward the retaining mechanism 60, in the example by pushing the tie 400 in a direction oriented toward the support of the bracket 104. The passage portion 15 and the slot 17 are distinguished, in this case, by a change in direction in the main plane of the work table 10. Said change in direction can be seen, for example, in FIG. 5. In a different embodiment, the passage portion 15 and the slot 17 can be substantially in the extension and aligned with one another. The slot 17 extends the passage portion 15 downstream of the knotting lip 55.

Downstream of the slot 17, the clearance 21 takes the form here of an expanded portion of the opening 11 in relation to the slot 17. The slot 17 opens out into the clearance 21. The clearance 21, in this case, has a substantially circular form. The form and the dimensions of the clearance 21 are appropriate to the passage of the knot 401 from a bottom area of the work table 10 toward an area situated above the work table 10. In other words, the clearance 21 forms a release passage for the knot 401.

At the end of the sliding of the knot 401 along the slot 17, the knot 401 reaches the clearance 21 and crosses it. The tie 400 urges the knot 401 into the vicinity of the article 500 as a result of retraction of the tie 400 and/or expansion of the article 500.

The clearance 21 is situated remotely from the knotting lip 55 in the direction of transfer A. In the direction of transfer A of the article 500, the distance separating the clearance 21 from the knotting lip 55 in the direction of transfer A corresponds substantially to the length of the slot 17 of the opening 11. In the embodiment shown in the figures, the length of the slot 17 is approximately 170 millimeters. In variants, the slot 17 has a length in excess of 35 millimeters.

The knot can therefore cross the work table toward the article only when the article is remote from the knotting lip. The space situated between the knotting lip and the knot release clearance in the direction of transfer can therefore be used to incorporate an additional packaging station, for example the labeling machine 200.

As an option, the knotting mechanism 55 comprises a plate 51 which is arranged above the knotting lip 55 such as is shown in the figures. A notch 53 is arranged in the plate 51. The notch 53 opens toward the upstream of the area of transfer (toward the left in FIG. 2). The bottom of the notch 53 is arranged substantially to the right of the knotting lip 55, above said latter. Before the arm 103 descends, the tie 400 crosses the plate 51 through the notch 53.

The work table 10 is fixed in a parallel manner to the plate 51. The work table 10 is retained substantially above the plate 51 such that a vertical gap is kept between the plate 51 and the work table 10. Said gap, which can be seen in FIG. 3, can be regulated, for example, by interposing washers of a chosen thickness between the work table 10 and the frame 101 at the orifices 12 which are arranged in the work table 10 for fixing the work table 10 to the rest of the tying unit 1. The gap is greater than the diameter of the knot 401.

Once released from the knotting lip 55, the knot 401 passes through the notch 53 of the plate 51, in the vicinity of the bottom of the notch 53.

In the example described here, the contour of the notch 53 serves as support for the tie 400 during the knotting process. As a variant, the tie 400 can be held by other members during the knotting process. The tying unit 100 does not have to have the plate 51.

In the example shown in the figures, the device 1 is semi-automatic. The movement of the article 500 is generated by an operator who moves the article 500 manually.

In an automatic embodiment, the tying unit 100 is incorporated within a machine or a production line and therefore constitutes a tying station. The article 500 is moved by means of a conveying system. The conveying system is configured in order to move the articles 500 one after another. The movement of the articles 500 can be continuous or step-by-step along a transfer path of the machine passing through the area of transfer of the tying station. In the main, the operations and the structures remain similar. However, the tying machine is adapted at points in order to cooperate with the conveying system. For example, the structure 101 and the casing 102 can be common to other parts of the packaging line.

Whether or not the configuration is automatic or semi-automatic, the slot 17 allows the movement of the article 500 to be guided once the tie 400 is knotted whilst the article 500 is driven by an operator or by the conveying system.

In variants, the slot 17 extends in a direction included in the main plane of the work table 10 but forming a non-zero angle in relation to the direction of transfer A. The knot 401 can therefore be guided by being offset in a direction substantially perpendicular to the direction of transfer A. The loop of the tie 400 closed by the knot 401 can be moved around the article 500 substantially in the extended direction of the article 500. For example, the loop of the tie 400 can be arranged and knotted around the base of stems of flowers of a bouquet then can be pushed up toward the flowers of the bouquet after knotting.

The tensile force of the tie 400 pulling on the knot 401 which is held by the work table 10 allows the tightening of the knot 401 itself to be increased. The reliability of the tying is improved by this. The risk of accidental untying is reduced.

In the example shown in the figures, the work table 10 is additionally provided with a deflector 25. The deflector 25 juts out from a face of the body 23, in this case from the bottom face. As shown in FIG. 8, the deflector 25 forms an angle α with the face of the body 23 by opening in the direction of the direction of transfer A of the article 500. The angle α, in this case, is between 18° and 25°, for example approximately 20°.

The work table is in the general form of a plate whilst the deflector is configured as a portion of the plate which is offset vertically in relation to the main plane of the plate. The production of the work table is therefore easy and cheap. For example, the work table is realized by configuring a sheet-metal plate, then the deflector 25 is obtained by bending part of the plate. Possible sharp edges can be additionally machined in order to reduce the risks of accidentally cutting the tie 400 and the users.

The slot 17 of the opening 11 comprises an end portion which is remote from the knotting lip, or downstream end 18. The downstream end portion 18 is provided with a through-hole in the deflector 25. The downstream end portion 18 extends in part along the deflector 25. The downstream end portion 18 therefore extends in a direction forming an angle α with the direction of transfer A of the article 500. The clearance 21 for the release of the knot 401 is arranged in the vicinity of the free end of the deflector 25, through the deflector 25 and at the downstream end of the downstream end portion 18 of the slot 17.

As can be better seen in FIG. 8, the deflector 25 and the downstream end portion 18 of the slot 17 which is arranged there define a space D with the body 23. The size of the space D in the substantially vertical direction increases in a substantially continuous manner progressing in the direction of transfer A, corresponding to the angle α.

In the example described here, the downstream end portion 18 has a specific configuration: it is arranged in order to guide the knot 401 downward at the end position and before release of the knot 401 through the clearance 21.

In operation, once the knot 401 has been released from the knotting lip 55, the knot 401 is guided along the guide slot 17. When the knot 401 contacts the deflector 25 along the downstream end portion 18, it is offset downward by the deflector 25. The article 500 remains held above the body 23 of the work table 10, for example by its contact. The loop of the tie 400 is therefore stretched between the article 500 and the knot 401 in a substantially vertical direction.

During operation, the knot 401 is therefore moved away from the article 500, in this case downward. A passage section in the loop of the tie 400 is open as is shown, for example, in FIG. 15. It is therefore easy to intervene in the disengaged parts of the tie 400 in order to fix a label there for example and/or to insert an object between the article 500 and the tie 400 which surrounds it. Such an operation can be realized under the work table 10 without impeding the movements above the work table 10.

Part of the loop of the tie 400 in the vicinity of the knot 401 is therefore accessible in the space D. Said configuration is shown schematically in FIGS. 13 and 15. The portion of the loop held under the work table 10 defines a free area. The form and dimensions of the free area are functions of the space D and of the section of the article 500 around which the tie 400 is circled. The space D provides access to part of the tie 400 which extends between the knot 401 and the article 500. Access is transversally in the direction of transfer A. Such accessibility allows for intervention in the tie 400 during packaging, either by means of a manual operation or by the addition of a supplementary station in an automated packaging line.

At said stage in the packaging cycle, various additional operations for tying/bundling can be realized.

For example, in the case of realizing bouquets of flowers, the free area between the flower stems and the knot 401 can be utilized to insert a sachet of plant protection product and/or a label. In another example, a straw can be slid between the tie 400 and a pressurized container that is surrounded by the tie 400.

In general, the space situated under the work table 10 is less cluttered than the space situated above. In particular in automated installations, the systems for conveying the articles 500 often have a belt or band system supporting supports which have been specifically adapted to the articles 500. Any operation carried out above the work table 10 risks hindering the passage of the articles 500 and of the supports. The area situated under the work table 10 downstream of the knotting lip 55 is less cluttered. It is easier to install additional packaging means here for the tying procedure.

In the example shown in the figures, the body 23, which is substantially flat in shape, is intended to support the articles 500.

In the example described here, the deflector 25 juts out downward from the body 23 and is intended to pull the knot 401 downward. As a result, the space D created is situated on the opposite side of the work table 10 to the area of transfer. For the rest, as the top surface of the work table 10 is substantially flat, the direction of transfer A of the articles 500 is able to be arranged horizontally.

As a variant, the space D can be created above the work table 10. A deflector can be arranged so as to jut out from the top face of the body 23 of the work table 10. In said case, the downstream end portion 18 of the slot 17 and the clearance 21 for the release of the knot 401 are arranged in the body 23 of the work table 10. The deflector 25 is suitable for diverting, in this case raising, the articles 500 as they advance. When it is being transferred, the article 500 describes a bend. Said variant allows an additional packaging station to be added which operates above the main plane of the work table 10. This can be desirable, for example, when the space situated under the main plane is occupied.

In the example shown in FIGS. 1 to 5 and 10 to 13, the space D created is used for labeling the tie 400 surrounding the article 500. The labeling machine 200 in FIG. 1 is arranged so that the labels 300 are placed into the space D.

The labeling machine 200, in this case, comprises a semi-automatic device which is provided and used to close bags by means of labels 300. By way of example, a device of the type known by the reference "086A" or "086AS" marketed by Kwik Lok can be used as labeling machine 200. Using existing machines allows the design costs of the device 1 to be reduced. Furthermore, the tying device 1 can easily be modular by replacing the labeling machine 200 with another machine in terms of the requirements. As a variant, the labeling station can be similar to that described in U.S. Pat. No. 4,171,602.

A label 300 is held, in an active part of the labeling machine 200, to the right of part of the slot 17, in this case in the space D created between the deflector 25 and the body 23 of the work table 10, upstream of the clearance 21 for the release of the knot 401. Such positioning is shown, for example, in FIGS. 10 and 11. The label 300 has a fixing part 301 and a body 302.

The fixing part 301, in this case, comprises a notch which is open toward the upstream side of the tying station 100. The label 300 is held so as to be immobile in relation to the work table 10. The label 300 is held by an active area of the labeling machine 200. In said position, the notch of the label 300 is arranged in the space D between the deflector 25 and the body 23 of the work table 10.

As the article 500 advances, before the knot 401 is released through the clearance 21, part of the loop of the tie 400 held in the space D is inserted into the notch of the label 300. A stop of the labeling machine 200 counters the movement of the label 300 in the direction of transfer A when a strand of the loop of the tie 400 penetrates into the notch.

The notch of the label 300, in this case, is in a form that is arranged to facilitate the penetration of the strand of the tie 400 into the notch and to prevent its accidental retraction from the notch in the opposite direction. The forms and dimensions of the notch can be adapted to the tie 400 used.

Notch forms are described, for example, in EP 0 053 390 for closures which are intended to close bags. Notches of a similar shape and of dimensions adapted to the tie 400 can be configured in the labels 300 of the tying device 1.

Continuing to advance in the direction of transfer A, the strand of the tie 400 is inserted into the notch until reaching the clearance 21 and the knot 401 is released. The article 500, the tie 40 which surrounds it and the label 300 fixed on a strand of the tie 400 can therefore be extracted from the device 1.

By attaching the label 300 on the tie 400 solely once the same has been knotted, the relative positioning of the article 500 and of the label 300 is precise. Once the label 300 has been extracted, the labeling machine 200 arranges a new label 300 in the space D by means of the active area of the labeling machine 200. The new label 300 is used to label the article 500 in the following operating cycle.

In the example described here, the engagement of one single strand of the tie 400 in the label 300 is sufficient for the labeling. As a variant, the two strands of the loop of the tie 400 on both sides of the knot 401 can be engaged in the notch of the label 300. To do this, the relative positioning of the label 300 by the active area of the labeling machine 200 and of the space D is adjusted in the direction of transfer A. The label 300 is held, for example, further upstream in the direction of transfer A. In said case, the knot 401 only crosses the clearance 21 once the two strands of the loop of the tie 400 have been inserted into the notch of the label 300.

An article 500 which has been bundled in such a manner comprises a label 300 which is arranged between the article 500 and the knot 401. The indexing of the label 300 along the loop of the tie 400 around the article 300 is improved in this manner and is preserved over time. The knot 401 counters the sliding of the label 300 along the tie 400 in both directions.

In the embodiment shown in FIG. 1, the labels 300 are stored beforehand attached to one another in the form of a reel. The directions for opening the notches of the labels 300 of the reel are aligned together. In other words, the notches of the labels 300 are oriented in the unwinding direction E of the reel, in any direction but in the opposite direction to that of the direction of transfer A. Such a configuration is particularly suitable for a semi-automatic installation. The operator moves the article 500 until at least one of the strands of the tie 400 is locked in the label 300, then extracts the article 500, which is bundled and labeled, by pulling the unit in a substantially upward direction and in the opposite direction to the direction of transfer A.

In another embodiment, which is suitable for an automated configuration in a packaging line comprising a conveying system, the labeling station is adapted. The unwinding direction E of the reel of labels 300 is oriented substantially perpendicular to the direction of transfer A. Thus, the position of the labeling machine 200 is such that the movement of the articles 500 in the direction A is not impeded. The labels 300 are mounted on a reel such that the notches of the labels 300 are oriented perpendicularly to the unwinding direction E of the reel. In other words, instead of being configured longitudinally in relation to the tying station 100, the labeling station 200 operates transversally to the tying station 100. The labels 300 are brought and held in the interval D in a direction which is substantially perpendicular to the direction of transfer A.

When the articles 500 are conveyed beyond the clearance 21, the stop of the labeling machine 200 is retracted in order to release the label 300 once it is engaged around at least one strand of the loop of the tie 400. The label 300 is extracted from the active part of the labeling machine 200 by the loop of the tie 400. The bundled and labeled article 500 continues its path along the packaging line in the direction of transfer A. Additional stations can be provided in the device 1.

The labeling machine 200 is configured in order to separate a label 300 from the rest of the reel by means of cutting or tearing and to arrange it then hold it in the space D during a cycle. Separating the label 300 from the reel can be realized before the tie 400 is inserted there or can be brought about when the label 300 is being extracted from the space D. In variants, the labels 300 are stored in a detached manner, for example in a stack. The labeling machine 200 can also be called a label distributor.

The labeling station 200 which operates in a transverse manner can be used in a semi-automated tying device.

In the examples described up to now, the work table bears a work surface which is inserted between the article, which is moving from a first side of the work surface (the top of the table), and the tying member on the second side of the surface (the top of the table). The top of the table corresponds to the space situated opposite the work surface. The bottom of the table corresponds to the space situated behind the work surface. The slot in the work surface extends in general in the direction of transfer. The slot is arranged in order to hold the knot on the second side of the work surface at least over part of the movement.

According to another aspect, the invention also covers an accessory which is intended to equip an existing tying/bundling machine in order to make it combinable with an existing labeling machine or with a machine which is provided to close bags so as to realize a work surface. For example, such an accessory can take the form of a plate which is configured such as is shown in FIGS. 7 to 9 and which is suitable to be assembled on an existing tying machine so as to form the work table 10 described above, for example by replacing an existing work table.

The invention can also be seen as a tying method during which, instead of completely releasing the knot after knotting as in the known devices, the knot is held at a distance and/or it is moved away from the article in order to facilitate packaging operations subsequent to the knotting process.

With respect to a work surface supported by any member according to the invention, the work table additionally has the characteristic of being oriented substantially horizontally and of defining the bottom limit of the area of transfer. A work table can have an advantageous additional function of supporting articles which are moved on top. Nevertheless, said characteristics of the work table do not have the character necessary for implementing the invention.

In other words:

The work surface according to the invention can be substantially horizontal but define the top limit of the area of transfer with the tying member arranged above it.

The work surface can be arranged at a slant in relation to the horizontal, for example vertically. When the work surface is arranged vertically, the article and the knot are separated laterally.

In the embodiment shown in the figures, the work surface and the surface supporting the articles are the same, or at least at the same level, and are supported by the work table. As a variant, the work surface and the surface for supporting the articles can be realized in the form of different components, including being arranged at different levels of the tying device.

Obviously, the invention is not limited to the embodiments described previously by way of example, but it incorporates all the variants that the expert is able to imagine within the framework of the claims below.

The invention claimed is:

1. A tying device of the type comprising:
   a work surface comprising an opening;
   a tying member which is activatable so as to place at least one tie around an article which is moving in a direction of transfer from a first side of the work surface and so as to bring part of said tie from a second side of the work surface located opposite the first side thus forming at least one loop;
   a knotting lip which is capable of closing the loop by means of a knot on the second side of the work surface;
   in which the opening is configured at least partially as a slot which extends generally in the direction of transfer and which is arranged in order to allow part of the loop to pass through but to hold the knot on the second side of the work surface over at least part of the movement of the article in the direction of transfer.

2. The tying device as claimed in claim 1, in which the work surface is supported by a work table which is arranged substantially horizontally and in which the first side of the work surface and the second side of the work surface correspond respectively to the top and to the bottom of the work table.

3. The device as claimed in claim 1, in which the opening comprises an expanded portion into which the slot opens out and which is arranged in order to allow the knot to pass through, the expanded portion being at a spacing from the knotting lip in the direction of transfer.

4. The device as claimed in claim 1, in which the slot extends in part to the right of the knotting lip.

5. The device as claimed in claim 1, in which the opening further comprises a passage portion for the tie, and the slot merges with the passage portion substantially to the right of the knotting lip.

6. The device as claimed in claim 1, comprising a deflector which is arranged in order to move the knot away from the article during the movement of the article in the direction of transfer, when the knot is held by the second side of the work surface.

7. The device as claimed in claim 6, in which the deflector is arranged in order to deflect the article with respect to the knot, to the right of at least part of the slot, during the movement of the article in the direction of transfer.

8. The device as claimed in claim 6, in which the deflector is arranged in order to deflect the knot with respect to the article during the movement of the article in the direction of transfer.

9. The device as claimed in claim 6, in which the work surface is supported by a part which is in the general form of a plate, and the deflector is configured as a portion of the plate which is offset in relation to a main plane of the plate.

10. The device as claimed in claim 9, in which the slot is arranged at least in part in the portion of the plate which is offset toward the second side.

11. The device as claimed in claim 1, further comprising a distributor of labels, in which the active part of the distributor is situated to the right of at least part of the slot.

12. The device as claimed in claim 1, comprising an access to part of the tie which extends between the knot and the article, the access being transversally to the direction of transfer.

13. An accessory for a tying device of the type comprising a tying member, which is activatable so as to place at least one tie around an article which is moving in a direction of transfer, and a knotting lip, the accessory being suitable so as to be assembled on the device in a manner so as to form a work surface thereon which comprises an opening which is configured at least partially as a slot, in such a manner that the tying member places the tie around the article from a first side of the work surface and brings part of said tie from the second side of the work surface thus forming at least one loop, whilst the knotting lip closes the loop by means of a knot on the second side of the work surface, the slot extending in general in the direction of transfer, the slot being arranged in order to allow part of the loop to pass through but to hold the knot on the second side of the work surface over at least part of the movement of the article in the direction of transfer.

14. An automatic labeling method, in which an article is moved, in a direction of transfer, from a first side of a work surface which comprises an opening which is configured at least in part as a slot, at least one tie is placed around the article from the first side of the work surface and part of said tie is brought from the second side of the work surface thus forming at least one loop, and the loop is closed by means of a knot on the second side of the work surface, in which part of the loop is allowed to pass through the slot, where the knot is held on the second side of the work surface due to said slot during at least part of the movement of the article in the direction of transfer, whilst the article is moved away from the slot so that a label is placed between the article and the knot.

* * * * *

UNITED STATES PATENT AND TRADEMARK OFFICE
CERTIFICATE OF CORRECTION

PATENT NO. : 10,259,605 B2
APPLICATION NO. : 15/110965
DATED : April 16, 2019
INVENTOR(S) : Eric Lechevalier Page 1 of 1

It is certified that error appears in the above-identified patent and that said Letters Patent is hereby corrected as shown below:

On the Title Page

Item (54) and in the Specification, Column 1, Line 1, "Tying Device" should be "Improved Tying Device"

Signed and Sealed this
Thirteenth Day of August, 2019

Andrei Iancu
*Director of the United States Patent and Trademark Office*